UNITED STATES PATENT OFFICE.

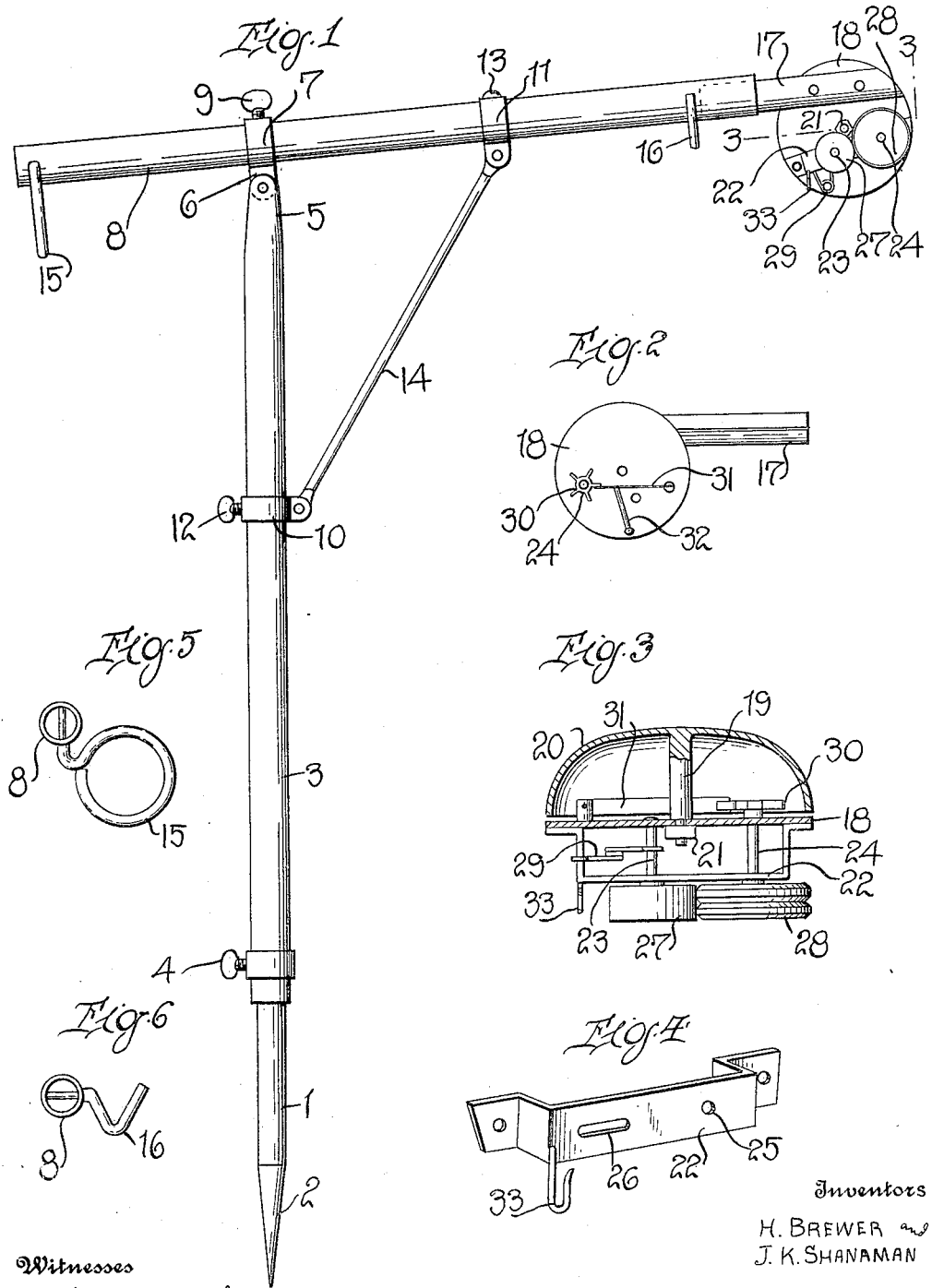

HARVEY BREWER AND JOHN K. SHANAMAN, OF ANNVILLE, PENNSYLVANIA; SAID BREWER ASSIGNOR TO GEORGE P. SPEICHER, OF LEBANON, PENNSYLVANIA.

COMBINED FISHING-ROD SUPPORT AND ALARM.

1,132,158.   Specification of Letters Patent.   Patented Mar. 16, 1915.

Application filed July 11, 1914. Serial No. 850,430.

*To all whom it may concern:*

Be it known that we, HARVEY BREWER and JOHN K. SHANAMAN, citizens of the United States, residing at Annville, in the county of Lebanon and State of Pennsylvania, have invented certain new and useful Improvements in Combined Fishing-Rod Supports and Alarms, of which the following is a specification, reference being had to the accompanying drawings.

This invention relates to fishing apparatus, and particularly to combined fishing rod supports and alarms.

An object of this invention is the provision of a fishing rod support, whereby the rod may be supported at any desired angle with relation to the horizontal, the support including a vertical standard having a sharpened lower end for engagement in the ground, and a laterally extending arm pivotally connected to the upper end of the standard, the fishing rod being adapted for loose connection to the laterally extending arm.

A further object of this invention is the provision of a device of this character which includes an alarm mechanism connected to the outer end of the laterally extending arm which supports the fishing rod, the rod being disposed above the alarm mechanism, so that the fishing line may be connected with the mechanism, whereby upon a pull on the line, the alarm mechanism is actuated.

With these and other objects in view, our invention consists in the novel construction, combination and arrangement of parts, to be hereinafter more fully described, claimed and illustrated in the accompanying drawing, in which—

Figure 1 is a side elevational view of our device. Fig. 2 is a side elevational view of the bell supporting plates and rod, Fig. 3 is a sectional view on the line 3—3 of Fig. 1, Fig. 4 is a perspective view of the bearing plate, Fig. 5 is a view looking at one end of the fishing rod supporting arm, Fig. 6 is a view looking at the other end of the fishing rod supporting arm.

Referring more particularly to the drawing, the numeral 1 designates a tubular standard, in the lower end of which is mounted a pointed entering member 2, and telescopically mounted on the upper end of the standard is a vertically adjustable rod 3 which is secured in any desired adjusted position on the standard by a set screw 4 which extends through the rod 3 and into engagement with the standard. The upper end of the rod 3 is split to provide a pair of spaced ears 5 between which are pivotally mounted the depending apertured ears 6 of a collar 7, and slidably disposed through the collar 7 is a laterally extending tubular arm 8, the arm being held in adjusted position with relation to the collar by a set screw 9. Slidably mounted on the rod 3 is a collar 10, and slidably mounted on the arm 8 forwardly of the collar 7 is a similar collar 11, the collars 10 and 11 being secured in adjusted position upon the rod 3 and the arm 8 by the set screws 12 and 13 respectively. Pivotally connected at its opposite ends to the sleeves 10 and 11 is a brace rod 14, by means of which the arm 8 may be disposed at any desired angle with relation to the vertical plane of the standard, upon movement of the collar 10 upwardly or downwardly upon the rod 3. Connected to the inner end of the arm 8 is a ring 15 in which the butt end of the fishing rod is adapted to engage, the ring extending to one side of the arm, and connected to the arm adjacent its forward end is a laterally extending hook 16 in which the rod rests, whereby the fishing rod is disposed in substantially the same plane as the arm 8, and to one side thereof.

Slidably mounted within the forward end of the arm 8 is a rod 17, and secured to the forward end of the rod which projects from the arm is a bell supporting plate 18, in which a central opening is formed to receive the threaded stem 19 of a bell 20, the bell being held in position upon the plate by the nut 21 mounted upon the outer end of the stem. Secured upon one face of the bell plate 18 is a bracket 22, the intermediate portion of which is spaced from the plate, and rotatably mounted at their inner ends in the plate are a pair of shafts 23 and 24. The outer end of the shaft 24 is rotatably mounted in an opening 25 formed in the intermediate portion of the bracket, and the outer end of the shaft 23 is slidably and rotatably mounted in a slot 26 formed in the bracket.

The outer ends of the shafts project outwardly of the bracket and mounted on the projecting end of the shaft 23 is a roller 27, and mounted on the projecting end of the shaft 24 is a pulley 28, and connected at one end to one leg of the bracket and at its opposite end to the shaft 23 is a substantially V-shaped spring 29, the tension of which normally forces the shaft 23 toward the shaft 24 whereby the periphery of the roller 27 is engaged against the periphery of the pulley 28. The inner end of the shaft 24 extends within the bell 20 and mounted on the inner projecting end of the shaft is a toothed wheel 30. Connected at one end to a stem projecting inwardly from the plate 18 is a spring 31, the free end of the spring being disposed in the path of the teeth of the wheel 30, and the spring having a striker rod 32 connected thereto intermediate its end, the free end of the striker rod normally resting upon the inner wall of the bell, owing to the tension of the spring 31. Depending from the bracket inwardly of the roller 27 is a fishing line guide 33, the purpose of which will be hereinafter more fully described.

In the practical use of our improved device, the entering member is forced into the ground, and the rod 3 is raised to a desired height and is held in its adjusted position by the engagement of the set screw 4 with the periphery of the standard 1. The arm 8 is then adjusted to the desired angle with relation to the horizontal, and is secured in its adjusted position by the engagement of the set screw 12 against the periphery of the rod 3, and the device is then in a position for use to support a fishing rod. The inner end of the fishing rod is disposed within the ring 15, and the rod intermediate of its ends rests in the hook 16, the fishing line extending from the reel on the rod, being passed through the line guide 33, and the roller 27 is forced against the tension of its spring from the pulley, so that the line may be passed between the roller and the pulley, and upon the release of the pulley, the line is tightly engaged between the roller and pulley, whereby upon movement of the line, the pulley is rotated. It will be seen that when the end of the line carrying the hook is disposed in the water, and that a fish grasps the hook and attempts to run with the same, the line will be unreeled, and in passing between the roller and the pulley, will rotate the pulley by reason of the tension of the roller against the line, whereby the toothed wheel 30 on the inner end of the shaft 24 is rotated, the teeth of the wheel engaging the free end of the spring 31 and retracting the spring, so that upon release of the same the striker rod is forced against the wall of the bell to detonate the bell to give an audible signal that a fish is on the hook.

From the above description taken in connection with the accompanying drawing, it will be seen that a rod may be supported at any desired angle with relation to the horizontal by means of our improved device, it being unnecessary to support the rod in the hands while fishing.

It will be apparent, that it will be unnecessary to watch the line, as when a fish pulls upon the same the bell is instantly rung, and the rod may be quickly and easily disengaged from the support, so that the fish may be caught in the ordinary manner.

What we claim and desire to secure by Letters Patent is:—

1. The combination with a supporting member adapted to support a fishing pole, of a line alarm mounted thereon comprising a plate attached to said support, a gong mounted on the plate, opposed rollers resiliently forced into frictional engagement with each other and adapted to receive the fishing line between them, a shaft operatively connected to one of said rollers, a toothed wheel mounted on the shaft, a striker oscillated by the toothed wheel, and means for guiding the line between said rollers.

2. The combination with a supporting member adapted to support a fish pole, of a line alarm comprising a plate attached to said support, a gong mounted upon the plate, stub shafts projecting from the plate, one of said shafts being loosely mounted, opposed contacting rollers mounted upon said shafts and between which the fishing line is adapted to pass, and a spring urging said loose shaft in a direction to force its roller against the opposed roller, and striking means operatively connected to the inner end of one of said shafts.

3. The combination with a fishing rod support, of a line alarm comprising a plate attached to said support, a hollow gong mounted upon said plate, a shaft extending through said plate, a toothed wheel mounted upon the inner end of the shaft, a spring striker engaged with said toothed wheel, a corrugated roller mounted upon the end of the shaft, a smooth faced roller supported in contact with the corrugated roller, the fishing line being adapted to pass between the two rollers, and means yieldingly urging the smooth faced roller against the corrugated roller.

In testimony whereof we hereunto affix our signatures in the presence of two witnesses.

HARVEY BREWER.
JOHN K. SHANAMAN.

Witnesses:
J. W. Ross,
Geo. P. Speicher.